United States Patent [19]

Heckman

[11] 4,156,228

[45] May 22, 1979

[54] ACOUSTIC TRANSDUCER WITH ACOUSTIC ISOLATING MOUNTING BASE

[75] Inventor: Donald B. Heckman, Sterling, Va.

[73] Assignee: EG&G International, Inc., Waltham, Mass.

[21] Appl. No.: 819,519

[22] Filed: Jul. 26, 1977

[51] Int. Cl.² .......................................... H04B 13/00
[52] U.S. Cl. ..................................... 340/8 R; 340/10
[58] Field of Search ................. 340/8 R, 8 FT, 8 PC, 340/8 LF, 9, 10, 12, 13

[56] References Cited

U.S. PATENT DOCUMENTS

| 2,733,423 | 1/1956 | Camp | 340/10 |
|---|---|---|---|
| 2,774,892 | 12/1956 | Camp | 340/9 UX |
| 2,906,993 | 9/1959 | Steinberger | 340/8 PC |
| 3,277,434 | 10/1966 | Buchanan | 340/8 PC |
| 4,004,226 | 1/1977 | Cook et al. | 340/9 |

Primary Examiner—Harold J. Tudor
Attorney, Agent, or Firm—George W. Price; John H. Gallagher

[57] ABSTRACT

An acoustic transducer for use under water is constructed in such a manner that when out of the water the transducer element is substantially isolated from vibrations that otherwise would be coupled thereto from the mounting base on which it is mounted.

15 Claims, 2 Drawing Figures

U.S. Patent  May 22, 1979  4,156,228
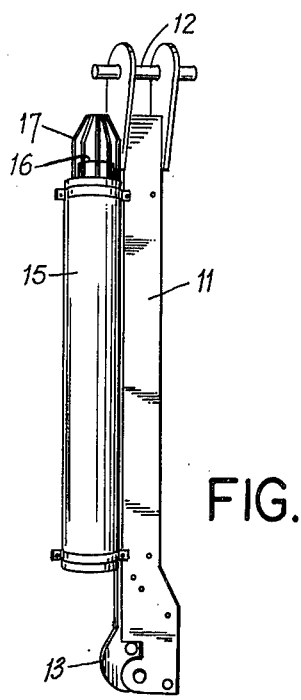
FIG. 1
FIG. 2
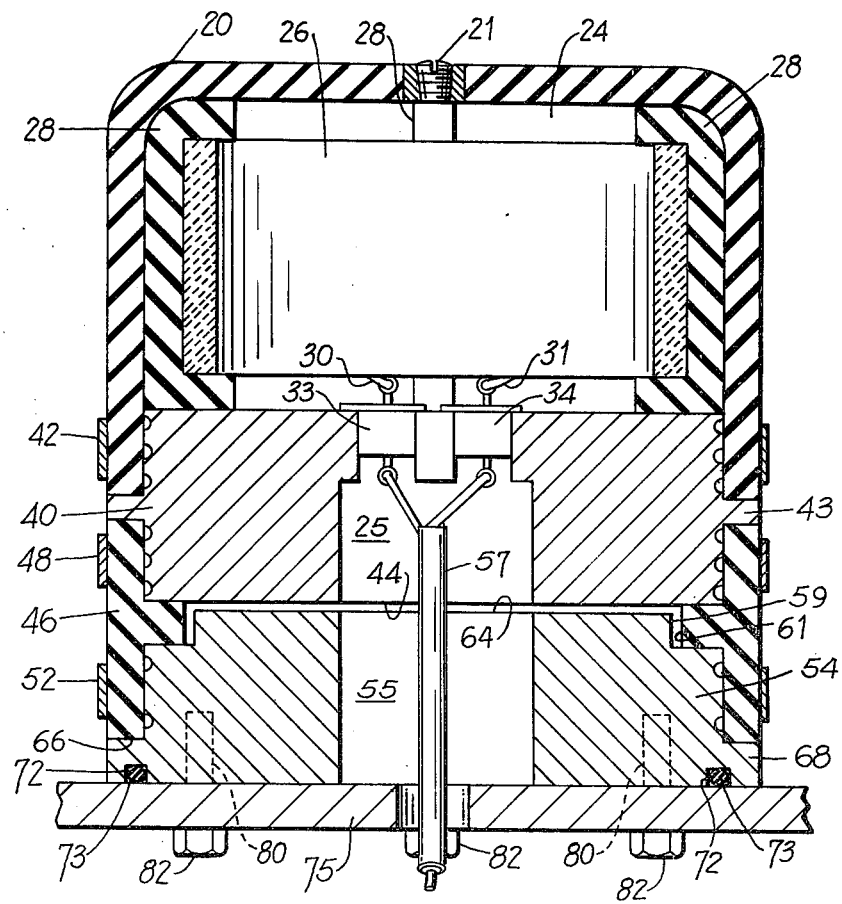

ACOUSTIC TRANSDUCER WITH ACOUSTIC ISOLATING MOUNTING BASE

BACKGROUND OF THE INVENTION

In recent years in connection with the undersea exploration, drilling, and gathering of gas and oil, acoustic command and control apparatus, and acoustic communication systems have been widely used. One example of such equipment intended for use at deep sea depths is an acoustically actuated underwater release mechanism described in U.S. Pat. No. 3,848,226, issued Nov. 12, 1974, to G. R. Perez. In that underwater apparatus, an acoustic transducer is secured to a sealed tubular housing that contains electronic and electromechanical apparatus. The transducer is responsive to an acoustic command signal that is received from a transmitter associated with a surface vessel, for example. The transducer produces an electrical signal that is coupled to the electronic circuitry within the housing. The circuitry produces an actuating signal that causes an externally mounted latching mechanism to release.

Prior to deploying apparatus of the type described in the Perez patent, the electronic system in the apparatus is activated and tested. This may be aboard a work ship or barge prior to dropping the apparatus over the side. The housing of the apparatus is often subject to considerable vibration and other acoustic noise that is caused by the engine and other machinery on the work boat or barge. It has been found that these vibrations in the apparatus housing are mechanically coupled to the acoustic transducer and produce spurious and unwanted signals in the acoustic receiver system. These anomalous signals sometimes complicate the process of checking out the system. The problem is not present after the apparatus is in position in the water since the housing no longer is subject to the substantial shipboard vibrations.

SUMMARY OF THE INVENTION

An acoustic transducer intended for use on apparatus located at deep working depths in the ocean includes an acoustic transducer element mounted above the top surface of a reflection plate. The transducer element is immersed in a liquid acoustic coupling medium and an elastomeric acoustically permeable housing surrounds the element and reflection plate.

An elastomeric band is clamped to the bottom of the reflection plate and to a mounting base in a manner to maintain a spacing or gap between the reflection plate and mounting base when they are out of the water. The gap provides acoustic isolation between the mounting base and reflection plate, thus minimizing the amount of spurious acoustic noise and vibrations that will be picked up by the transducer element when it is out of the water.

The interior of the reflection plate and mounting base are void and sealed from the outside environment so that hydrostatic pressure will force the mounting base and reflection plate into contact when the apparatus is at its working depth.

BRIEF DESCRIPTION OF THE DRAWINGS

FIG. 1 is a simplified illustration of apparatus on which the present invention may be used; and FIG. 2 is a cross sectional representation of the isolating transducer of the present invention.

DESCRIPTION OF PREFERRED EMBODIMENT

FIG. 1 is a simplified illustration of acoustically responsive, remotely operated release apparatus on which the present invention may be used. The apparatus includes a pair of parallel support plates 11, connector or suspension means 12 at the top, and a hook 13 releasably held between the bottom ends of the parallel support plates. A watertight cylindrical housing 15 is secured to support plates 11. Acoustic receiver means responsive to an acoustic transmitter on or near the surface, and electromechanical means for actuating the release mechanism of hook 13 are contained within housing 15. An acoustic transducer 16 is positioned within a protective cage 17 on top of housing 15 and is electrically connected to apparatus within the housing. Reference may be had to the above mentioned Perez patent for a complete description of the apparatus of FIG. 1.

FIG. 2 is a cross sectional view of an acoustic transducer constructed in accordance with the present invention. The exterior shape of the transducer is that of a figure of revolution. The top portion of the transducer is comprised of an elastomeric housing or boot 20 in the general shape of a hollow cylinder having one open end and one closed end. Boot 20 may be made of rubber, neoprene, or other elastomeric or suitable acoustically permeable material commonly used in this art. A threaded plug 21 is located in a threaded fitting in the top of boot 20 to permit an acoustic coupling liquid to be introduced into the interior of the transducer, as is common.

The interior of the device includes a liquid filled chamber 24 in which the electroacoustic transducer element 26 is disposed. Transducer element 26 is supported within chamber 24 by U-shaped elastomeric brackets 28 that are secured to the inner surface of housing boot 20.

The particular type of transducer element 26 is not the subject of this invention and any one of many commercially available types may be used in the practice of this invention. I presently employ a commercially available piezoelectric transducer element in the form of a ceramic cylinder having appropriate electrodes.

The wire connectors 30 and 31 of the transducer element 26 are connected to respective electrical feedthroughs 33 and 34 that are secured in a metal cylindrical member 40. Feedthroughs 33 and 34 provide high pressure seals between liquid filled chamber 24 and the opposing central void space 25, as will be explained. Member 40 serves as a reflection plate and is displaced below transducer element 26 a given distance to produce desired transmit/receive characteristics for the transducer. The outer cylindrical surface of reflection plate member 40 is grooved or serrated in order to make a good fluid tight seal with the bottom portion of elastomeric housing boot 20. A band 42 tightly clamps the boot 20 to the reflection plate member 40. The reflection plate 40 has a planar, annular bottom surface 44.

The upper portion of a flexible, yieldable isolation collar 46 is secured to the lower cylindrical surface of reflection plate member 40 by means of a circumferential band or clamp 48. The top edge of isolation collar 46 is spaced from the bottom edge of housing boot 20 by the radially extending portion 43 of reflection plate 40. Isolation collar 46 is made of rubber, neoprene, or other suitable elastomeric material.

The bottom portion of isolation collar 46 is secured by circumferential band 52 to the grooved or serrated outer surface of a metal annular mounting base 54. The mounting base has a central aperture 55 in registration with central aperture 25 in reflection plate member 40. Electrical coaxial cable 57 is connected to feedthroughs 33 and 34 and passes through an aperature in member 75 to the interior of the cylindrical housing 15 of FIG. 1. Housing 15 is sealed in a water tight manner.

The very top portion of mounting base 54 is comprised of a short annular portion 59 having a flat top and a reduced diameter so as to form an inwardly extending step. Isolation collar 46 has an annular band 61 that projects radially inwardly from its mid region, and this band is disposed in the step or void region resulting from the reduced diameter on the top cylindrical portion 59 of mounting base 54. The thickness of the radial band 61 (in the vertical direction in FIG. 2) is chosen so that when the transducer is out of the water, i.e., at one atmosphere, the band maintains a gap or void space between the bottom surface 44 of reflection plate member 40 and the planar top surface 64 of mounting base 54.

There is an inwardly extending step 66 near the bottom of mounting base 54 and the bottom of isolation collar 46 is seated on this step. The outer surface of the isolation collar 46 is substantially flush with the bottom rim 68 on mounting base 54. An annular groove 72 is machined into the bottom surface of mounting base 54. O-ring 73 fits within groove 72 to provide a sealing fit to the member 75 on which the transducer is mounted. Member 75 may be the top wall of the cylindrical housing 15 of FIG. 1. The bottom surface of mounting base 54 has a plurality of threaded holes 80 therein, and mounting bolts 82 pass through member 75 and into the threaded holes.

It will be seen that the pressure feedthroughs 33 and 34 in the top of reflection plate member 40, and the O-ring 73 in sealing engagement with the bottom of mounting base 54 and member 75 isolate the annular void spaces 25 and 55 from liquid in which the transducer may be immersed. This means that there is no sea water or any other type of liquid in the gap between the bottom of reflection plate member 40 and mounting base 54. The absence of a liquid coupling medium in the gap maximizes the attenuation of acoustic waves that otherwise would be coupled from mounting base 54 through reflection plate member 40 to transducer element 26. The sealing of the annular void spaces 25 and 55 to the sealed interior of housing 15, FIG. 1, also assures that when the apparatus is submerged to its working depth there will be a pressure differential between the outside of the transducer and the void interior regions 25 and 55.

In the operation of the novel transducer of FIG. 2 when it is out of the water, elastomeric isolation collar 46 will be in the shape illustrated in FIG. 2 to maintain the gap or void space between the reflection plate member 40 and mounting base 54. As described above, the gap or void space between the reflection plate member and mounting base serves to provide acoustic isolation therebetween. Furthermore, isolation collar 46, being made of a selected rubber, neoprene, or other elastomeric material, is an attenuator of acoustic waves at the signal frequencies involved and also will effectively isolate transducer element 26 from vibrations in the member 75 (housing 15, FIG. 1) on which the transducer is mounted. Transducer element 26 therefore will not respond to those vibrations and the apparatus of FIG. 1 may be tested free of anomolous signals that otherwise would be present.

Considering now the operation of the device of FIG. 2 when submerged to a deep working level in the ocean, hydrostatic pressure will be exerted on the top and sides of the transducer, but not on the base because it is secured in a fluid tight manner to the rigid member 75 that is the cover of the pressure sealed housing 15 of FIG. 1.

As explained above, there will be a pressure differential between the outside and inside of the structure. This pressure differential will force the bottom surface 44 of reflection plate member 40 against the inwardly extending radial band 61 on isolation collar 46. Being elastomeric, the radial band 61 is compressed until the gap or void space between reflection plate member 40 and mounting base 54 is closed and the surfaces 44 and 64 are in contact. Isolation collar 46 no longer is effective for its acoustic isolating function, but the transducer no longer is in an environment where the isolation is required.

The vertical dimension of the radial band 61 of isolation collar 46 and the compressibility of the elastomeric material are selected so that the gap or void space between surfaces 44 and 64 is closed by hydrostatic pressure when the transducer reaches a given depth in the water.

It will be noted that once the reflection plate member 40 and mounting base 54 come into contact the inwardly extending radial band 61 on isolation collar 46 is, in effect, seated in an annular recess whose closed bottom is the outer surface of reduced diameter portion 59 of the mounting base. If the gap between reflection plate member 40 and mounting base 54 did not completely close at some predetermined hydrostatic pressure, the possibility exists that hydrostatic pressure acting radially inwardly against the outer surface of isolation collar 46 would force its radial band 61 into the gap somewhat in the nature of a forced extrusion, and would damage or destroy the isolation collar.

As illustrated in FIG. 2, the short section 59 of reduced diameter is on the top of mounting base 54. This is a matter of choice. The reduced diameter section could just as well be on the bottom of reflection plate member 40, or could be shared by reflection plate member 40 and mounting base 54. The only requirement is that the reduced diameter section be located so that an inwardly projecting radial band 61 on isolation collar 46 can be seated therein to hold the two members apart when out of the water and permit the two to close together when submerged.

Although not presently preferred, inwardly projecting band 61 on isolation collar 46 could be an annular member separate from the remainder of the isolation collar. Also, it may be possible to completely eliminate the inwardly projecting band 61 and allow a hollow cylindrical isolation collar to provide the gap or spacing between reflection plate 40 and mounting base 54. This alternative is not presently preferred.

It should be noted that when the bands 48 and 52 are pressed tightly against isolation collar 46, the collar tends to be elongated in its mid region between the bands, thereby tending to increase the spacing between reflection plate member 40 and mounting base 54.

In transducer apparatus constructed subsequently as illustrated in FIG. 2, the various component parts had the following approximate dimensions. Reflection plate 40 had a height of 1.68 inch and a diameter of 3.75 inches for the main portion of its body. Radially extending portion 43 was 4.25 inches in diameter. Mounting base 54 was 1.25 inch high and the diameter of its mid region was 3.75 inches. The top cylindrical portion 59 of mounting base 54 was 3.12 inches in diameter and had a height of approximately 0.25 inch. The height of isolation collar 46 was approximately 1.75 inch.

When assembled, the gap separating surfaces 44 and 64 was in a range of 0.030 to 0.040 inch.

The neoprene material of housing boot 20 and isolation collar 46 was approximately 0.25 inch thick. Housing boot 20 was substantially identical to the housing boot employed on the model ITC-3141 Underwater Transducer, manufactured by International Transducer Corp., Goleta, Calif.

While a preferred embodiment of the invention has been illustrated and described, it is to be understood that alterations and modifications may be made to the described embodiment without departing from the scope of the present invention.

I claim:

1. An electroacoustic transducer intended for use at given depths under water, said transducer comprising
    a mounting base having a first side adapted to be secured to a supporting structure,
    a reflection plate member disposed adjacent the opposite side of said mounting base,
    yieldable means being the sole means for maintaining a gap between the mounting base and reflection plate member and for providing a pressure tight seal for said gap,
    an acoustic transducing element disposed adjacent the side of said reflection plate member opposite said mounting base,
    acoustically permeable housing means enclosing said transducing element and said reflection plate member,
    said yieldable means being made of an elastomeric material that is an acoustic attenuator at frequencies within the intended operating frequency range of the transducer element and being sufficiently yielding to permit hydrostatic pressure at the intended depths of operation of said transducer to force said mounting base and reflection plate member into contact with each other, whereby said yieldable means and said gap provide acoustic isolation between the mounting base and the transducing element when the transducer is out of the water but not when the transducer is submerged to said given depths.

2. The transducer claimed in claim 1 wherein said yieldable means is comprised of an elastomeric collar secured at its opposite ends to said reflection plate member and said mounting base.

3. The transducer claimed in claim 2 wherein said yieldable means includes an annular band of elastomeric material extending radially inwardly between the mounting base and reflection plate member to yieldingly hold them apart when the transducer is out of water.

4. The combination claimed in claim 3 wherein said annular band of elastomeric material is integral with said elastomeric collar.

5. The combination claimed in claim 4 wherein said annular band of elastomeric collar is separate from said elastomeric collar.

6. The combination claimed in claim 3 wherein either or both said reflection plate member and mounting base have a reduced peripheral portion at/or adjacent said gap to receive said inwardly extending band of elastomeric material.

7. The transducer claimed in claim 1 wherein said mounting base and reflection plate member are figures of revolution having a common axis and having mating surfaces facing each other across said gap.

8. The combination claimed in claim 1 including a central void space in said mounting base, said void space being in communication with said gap, pressure seal means for passing electrical connection means from the transducing element to the void space in the mounting base.

9. The combination claimed in claim 1 including means for securing said mounting base to said supporting structure in a fluid tight manner.

10. An electroacoustic transducer adapted to be secured to apparatus intended to be used under water, said transducer comprising
    a mounting base having a first side adapted to be secured to said apparatus,
    a reflection plate member disposed adjacent the opposite side of said mounting base,
    yieldable elastomeric means between the mounting base and reflection plate member being the sole means for maintaining a gap between the mounting base and reflection plate member when the transducer is out of the water,
    yieldable means for sealing said gap to make a pressure tight seal between the mounting base and reflection plate member,
    a transducing element disposed above said reflection plate member,
    acoustically permeable housing means enclosing said transducing element and said reflection plate member,
    said elastomeric means and said yieldable means being made of a material that is an acoustic attenuator at frequencies within the operating frequency range of the transducer element and being sufficiently yielding to permit hydrostatic pressure at the intended depth of operation of said transducer to force said mounting base and reflection plate member into contact with each other, whereby said yieldable elastomeric means, said yieldable means and said gap provide acoustic isolation between the mounting base and the transducing element when the transducer is out of the water but not when the transducer is submerged to said given depths.

11. The transducer claimed in claim 10 wherein said base member and/or said reflection plate member have an inwardly extending step to receive said yieldable elastomeric means that maintains said gap.

12. The transducer claimed in claim 10 wherein
    said yieldable elastomeric means and said yieldable means are a unitary member of elastomeric material.

13. The transducer claimed in claim 10 wherein
    said mounting base is an annular member and includes means for securing the mounting plate to said apparatus in a fluid tight manner.

14. The transducer claimed in claim 13 wherein the transducer includes
    means for providing an electrical connection from said transducing element through the annular mounting plate to said apparatus.

15. In electroacoustic transducer apparatus intended to operate under water at least at a given depth, and adapted to be mounted on other apparatus, means for providing acoustic isolation between the transducer apparatus and said other apparatus when out of the water, said means comprising, an electroacoustic transducing element, a reflection plate member having a generally cylindrical outer surface and a first transverse surface disposed in spaced relationship to said transducing element, an elastomeric housing member in the form of a hollow cylinder having one closed end and one open end, means for securing the open end of the housing member to the outer surface of the reflection plate member to provide a liquid tight chamber for enclosing the transducing element between the closed end of the housing member and said first surface of the reflection plate member, an acoustic coupling medium in said chamber in acoustic coupling contact with the transducing element and said housing member, a generally annular shaped mounting base coaxially disposed adjacent a transverse surface of the reflection plate member opposite said first surface, an isolation collar of elastomeric material secured to and extending between the reflection plate member and the mounting base and providing a pressure tight seal therebetween, one or both the reflection plate member or/and mounting base having an annular section of reduced diameter adjacent the isolation collar, thereby forming an inwardly extending step, said isolation collar including an inwardly extending annular portion that extends into said step, said annular portion of the isolation collar being yieldable and being the sole means for maintaining a separating gap between the reflection plate member and the mounting base when the transducer apparatus is out of the water, means for providing fluid tight electrical feedthroughs from the transducing element in said fluid chamber through the interiors of the reflection plate member and mounting base, and means for providing a fluid tight seal between said mounting base and other apparatus on which it is mounted, the yieldable annular portion of the isolation collar being sufficiently yielding to permit hydrostatic pressure at the intended depth of operation of the transducer apparatus to force the reflection plate member into contact with the mounting base, said isolation collar being an acoustic attenuator at frequencies within the intended operating frequency range of the transducing element, thereby providing acoustic isolation between said transducing element and said other apparatus when the transducer apparatus is out of the water.

* * * * *